US011807252B2

(12) United States Patent
Beaurepaire et al.

(10) Patent No.: US 11,807,252 B2
(45) Date of Patent: Nov. 7, 2023

(54) METHOD AND APPARATUS FOR DETERMINING VEHICLE BEHAVIOR (71) Applicant: HERE GLOBAL B.V., Eindhoven (NL)

(72) Inventors: Jerome Beaurepaire, Nantes (FR); Leon Stenneth, Chicago, IL (US); Jeremy Michael Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 82 days.

(21) Appl. No.: 17/671,432

(22) Filed: Feb. 14, 2022

(65) Prior Publication Data
US 2023/0256977 A1 Aug. 17, 2023

(51) Int. Cl.
B60W 50/00 (2006.01)
G01C 21/00 (2006.01)
B60W 60/00 (2020.01)
B60W 50/14 (2020.01)

(52) U.S. Cl.
CPC ........ *B60W 50/0097* (2013.01); *B60W 50/14* (2013.01); *B60W 60/0051* (2020.02); *G01C 21/3811* (2020.08); *B60W 2050/146* (2013.01); *B60W 2420/42* (2013.01); *B60W 2540/30* (2013.01)

(58) Field of Classification Search
CPC ......... B60W 50/0097; B60W 60/0015; B60W 40/02; G06V 10/40; G06N 20/00; G06N 3/08; G06N 3/044; G01C 21/3815; G01C 21/3811
See application file for complete search history.

(56) References Cited

U.S. PATENT DOCUMENTS

| 9,672,734 | B1 | 6/2017 | Ratnasingam | |
| 10,902,349 | B2 | 1/2021 | Ghosh et al. | |
| 11,136,024 | B1 | 10/2021 | Konrardy et al. | |
| 11,657,268 | B1* | 5/2023 | Refaat | G06N 3/044 706/18 |
| 11,687,077 | B2* | 6/2023 | Ding | G06N 3/08 701/25 |
| 2019/0126921 | A1 | 5/2019 | Gwin et al. | |
| 2021/0208269 | A1 | 7/2021 | Carroll et al. | |
| 2021/0237745 | A1 | 8/2021 | Schiegg et al. | |
| 2022/0198262 | A1* | 6/2022 | Keserich | G01C 21/3815 |
| 2023/0097121 | A1* | 3/2023 | Schwartz | G06N 20/00 701/26 |
| 2023/0102844 | A1* | 3/2023 | Kim | B60W 40/02 701/26 |
| 2023/0150550 | A1* | 5/2023 | Shi | B60W 60/0015 701/23 |
| 2023/0162508 | A1* | 5/2023 | Xia | G06V 10/40 382/104 |

* cited by examiner

*Primary Examiner* — Yuri Kan
(74) *Attorney, Agent, or Firm* — Jeffrey R. Moisan; HERE GLOBAL B.V.

(57) ABSTRACT

A method, system, and computer readable storage medium are provided for predicting behavior of a vehicle. More specifically, image data of the vehicle is obtained by generating class prediction data for the vehicle and then identifying one or more related points of interest. The method, system, and computer readable storage medium then predict the behavior of the vehicle based upon the one or more points of interest and the class prediction data.

8 Claims, 5 Drawing Sheets

METHOD AND APPARATUS FOR DETERMINING VEHICLE BEHAVIOR

TECHNOLOGICAL FIELD

An example embodiment relates generally to a method, apparatus, computer readable storage medium, and computer program product for determining the behavior of a vehicle and, more particularly, for determining the behavior of a vehicle based upon image data of the vehicle.

BACKGROUND

Modern vehicles include a plurality of different types of sensors for collecting a wide variety of information. These sensors include location sensors, such as global positioning system (GPS) sensors, configured to determine the location of the vehicle. Based upon the location of the vehicle, a variety of navigational, mapping and other services may be provided for manually driven vehicles as well as the provision of navigation and control of autonomous or semi-autonomous vehicles. Other examples of sensors include cameras or other imaging sensors that capture images of the environment including objects in the vicinity of the vehicle. The images that are captured may be utilized to determine the location of the vehicle with more precision. A more precise determination of the vehicle location may be useful in conjunction with the provision of navigational, mapping and other informational services for a manually driven vehicle. Additionally, the more precise determination of the vehicle location may provide for the improved navigation and control of an autonomous or semi-autonomous vehicle by taking into account the location of other objects, such as other vehicles, in proximity to the vehicle carrying the sensors.

The sensors on board vehicles therefore collect a wide variety of data that may be utilized for various purposes. However, these sensors currently on board vehicles do have limitations and do not collect all of the different types of information that would be useful in various applications.

BRIEF SUMMARY

A method, apparatus, computer readable storage medium, and computer program product are provided in accordance with an example embodiment to predict the behavior of a vehicle. In this regard, the method, apparatus, computer readable storage medium, and computer program product of an example embodiment may utilize image data collected of the vehicle to identify the class of the vehicle based upon the data. The reliance upon the collection and analysis of image data may supplement the information provided by other sensors on board the vehicle and allow for the provision of different information, such as the class of the vehicle, that is useful for a variety of applications. By way of example, the identification of the class of vehicle may be useful for federal, state, local or other governmental or regulatory officials that design and maintain the road network. As another example, the identification of the class of vehicle driving over a road surface may be useful in relation to the provision of more relevant information to the vehicle and/or the driver of the vehicle.

In an example embodiment, an apparatus is provided that is configured to predict behavior of a vehicle based at least in part on image data. The apparatus includes at least one processor and at least one memory storing computer program code with the at least one memory and the computer program code configured to, with the processor, cause the apparatus to at least obtain image data of the vehicle while driving, wherein the image data includes physical characteristics of the vehicle; provide the image data to a first machine learning model; and then generate class prediction data for the vehicle utilizing the first machine learning model. The at least one memory and the computer program code are further configured to, with the processor, cause the apparatus to further: identify one or more points of interest; provide information regarding the one or more points of interest and the class prediction data for the vehicle to a second machine learning model; and then predict the behavior of the vehicle utilizing the second machine learning model based upon the one or more points of interest and the class prediction data.

This example embodiment may further include an apparatus wherein the at least one memory and the computer program code are further configured to, with the processor, cause the apparatus to receive an indication of a location of the vehicle, wherein the at least one memory and the computer program code are configured to, with the processor, cause the apparatus to obtain the location of the vehicle, and wherein the at least one memory and the computer program code are configured to, with the processor, cause the apparatus to identify one or more points of interest proximate the location of the vehicle. The apparatus may obtain the image data of the vehicle via a vehicle camera system or by any other functionally capable means.

This example embodiment may further include the at least one memory and the computer program code are configured to, with the processor, cause the apparatus to update a map layer with the one or more points of interest or predicted behavior of the vehicle. The at least one memory and the computer program code may also be configured to, with the processor, cause the apparatus to generate an alert in response to predicted vehicle behavior, wherein the alert is displayed on at least one end user device. The apparatus may also be configured to cause the apparatus to activate an autonomous driving mode in response to predicted vehicle behavior. The apparatus may yet also be configured to utilize the second machine learning model to identify additional points of interest based on road segments similarly situated to those identified by the apparatus.

Another example embodiment may be a method for predicting the behavior of a vehicle, the method comprising at least obtaining image data of a vehicle; generating class prediction data for the vehicle; identifying one or more points of interest; and predicting the behavior of the vehicle based upon the one or more points of interest and the class prediction data.

The example embodiment above may also include the method further comprising receiving an indication of a location of the vehicle and identifying one or more points of interest proximate the location of the vehicle; obtaining the image data of the vehicle from a vehicle camera system; an/or updating a map layer with the one or more points of interest or predicted behavior of the vehicle.

The example embodiment above may also include the method further comprising providing an alert in response to predicted vehicle behavior to at least one end user device; activating an autonomous driving mode in response to predicted vehicle behavior, and/or identifying at least one additional point of interest based on road segments similarly situated to the previously identified points of interest.

Yet another example embodiment may be a non-transitory computer-readable storage medium for machine-learning of vehicle behavior, carrying one or more sequences of one or more instructions which, when executed by one or more processors, cause an apparatus to: obtain image data of the vehicle while driving, wherein the image data includes physical characteristics of the vehicle; provide the image data to a first machine learning model; and generate class prediction data for the vehicle utilizing the first machine learning model; wherein the at least one memory and the computer program code are further configured to, with the processor, cause the apparatus to further: identify one or more points of interest; provide information regarding the one or more points of interest and the class prediction data for the vehicle to a second machine learning model; and predict the behavior of the vehicle utilizing the second machine learning model based upon the one or more points of interest and the class prediction data.

The example embodiment above may also include the non-transitory computer-readable storage medium further comprising one or more sequences of one or more instructions, with the processor, cause the apparatus to receive an indication of a location of the vehicle and identify one or more points of interest proximate the location of the vehicle. This example may further include a non-transitory computer-readable storage medium wherein the image data of the vehicle is obtained via a vehicle camera system.

The example embodiment above may yet also include the non-transitory computer-readable storage medium wherein the one or more sequences of one or more instructions, with the processor, cause the apparatus to update a map layer with the one or more points of interest or predicted behavior of the vehicle. This example may still yet also include the non-transitory computer-readable storage medium wherein the one or more sequences of one or more instructions, with the processor, cause the apparatus to provide an alert in response to predicted vehicle behavior. The non-transitory computer-readable storage medium example may also include the one or more sequences of one or more instructions, with the processor, causing the apparatus to utilize the second machine learning model to identify additional points of interest based on road segments similarly situated to those identified by the apparatus.

Also, a computer program product may be provided. For example, a computer program product comprising instructions which, when the program is executed by a computer, cause the computer to carry out the steps described herein.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment to determine the behavior of a vehicle based upon image data of the vehicle. In order to determine the behavior of a vehicle based upon image data, the method, apparatus, non-transitory computer-readable storage medium, and computer program product of an example embodiment are configured to train a first machine learning model utilizing training examples and/or real-world data. Once trained, the method, apparatus, computer program product, etc. of another example embodiment utilize the trained first machine learning model to analyze image data that is collected of a vehicle, the first machine learning model then determines the class of a vehicle at least in part via the image data of a given vehicle. The method, apparatus and computer program in some embodiments will take this generated class prediction data from the first machine learning model and then identify one or more points of interest and provide the generated class prediction data and point(s) of interest to a second machine learning model to predict behavior of the vehicle.

The apparatus, method, etc. described above may be any of a wide variety of computing devices and may be embodied by either the same or different computing devices. The apparatus may be embodied by a server, a computer workstation, a distributed network of computing devices, a personal computer or any other type of computing device, while the apparatus configured to utilize a trained machine learning models to identify the behavior of vehicles may similarly be embodied by the same or different server, computer workstation, distributed network of computing devices, personal computer or other type of computing device.

Alternatively, the apparatus, etc. may be embodied by a computing device on board the vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

Figure 1:
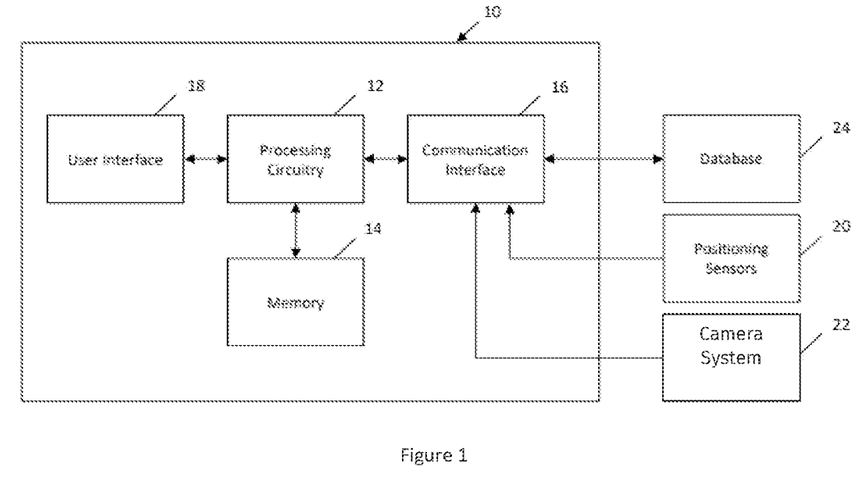
FIG. 1 is a block diagram of an apparatus that may be specifically configured in accordance with an example embodiment.

Regardless of the manner in which the apparatus is embodied, however, the apparatus 10 includes, is associated with, or is in communication with processing circuitry 12, memory 14, a communication interface 16 and optionally a user interface 18 as shown in FIG. 1. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally, or alternatively, the memory can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally, or alternatively, the processing circuitry can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively, or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., one or more map objects, POI data, etc.) generated and/or employed by the processing circuitry 12. Additionally, or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally, or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to vehicle or vehicle to infrastructure wireless links.

In certain embodiments, the apparatus 10 can be equipped or associated with one or more positioning sensors 20, such as one or more GPS sensors, one or more accelerometer sensors, one or more light detection and ranging (LiDAR) sensors, one or more radar sensors, one or more gyroscope sensors, and/or one or more other sensors. Any of the one or more sensors may be used to sense information regarding movement, positioning and location, and/or orientation of the apparatus for use, such as by the processing circuitry 12, in navigation assistance and/or autonomous vehicle control, as described herein according to example embodiments.

In certain embodiments, the apparatus 10 may further be equipped with or in communication with one or more camera systems 22. In some example embodiments, the one or more camera systems 22 can be implemented in a vehicle or other remote apparatuses.

For example, the one or more camera systems 22 can be located upon a vehicle or proximate to it (e.g., traffic cameras, etc.). While embodiments may be implemented with a single camera such as a front facing camera in a consumer vehicle, other embodiments may include the use of multiple individual cameras at the same time. A helpful example is that of a consumer sedan driving down a road. Many modern cars have one or more cameras installed upon them to enable automatic braking and other types of assisted or automated driving. Many cars also have rear facing cameras to assist with automated or manual parking. In one embodiment of the current system, method, etc. these cameras are utilized to capture images of other vehicles as the sedan travels. The system takes these captured images (via the camera systems 22) and analyzes them to determine the types of vehicles present. Certain types of vehicles may be grouped into vehicle classes such a farm equipment, oversized load, etc. The data captured concerning the types of vehicles present on a given roadway may also come from traffic cameras, security cameras, or any other functionally useful source (e.g., historic data, satellite images, etc.). The analysis of the image data is done by a first machine learning model. This model may utilize any functionally useful means of analysis to identify the vehicles present on a given roadway, road segment, or general area.

The system, in this embodiment, may then identify one or more points of interest, provide information regarding the one or more points of interest and the class prediction data for the vehicle to a second machine learning model; and predict the behavior of the vehicle utilizing the second machine learning model based upon the one or more points of interest and the class prediction data.

The locations of the vehicle(s) and points of interest (POIs) which utilize various embodiments of the system may each be identified in latitude and longitude based on a location of the vehicle using a sensor, such as a GPS sensor to identify the location of the vehicle. The POIs identified by the system may also be detected via the camera systems 22. For example, large semi-trucks may stop at truck stops with familiar signage (BP, Shell, etc.) and in some embodiments of the present innovation the system may examine the image data to identify such a point of interest.

In certain embodiments, information detected by the one or more cameras can be transmitted to the apparatus 10, such as the processing circuitry 12, as image data. The data transmitted by the one or more cameras can be transmitted via one or more wired communications and/or one or more wireless communications (e.g., near field communication, or the like). In some environments, the communication interface 16 can support wired communication and/or wireless communication with the one or more camera sensors.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Figure 2:
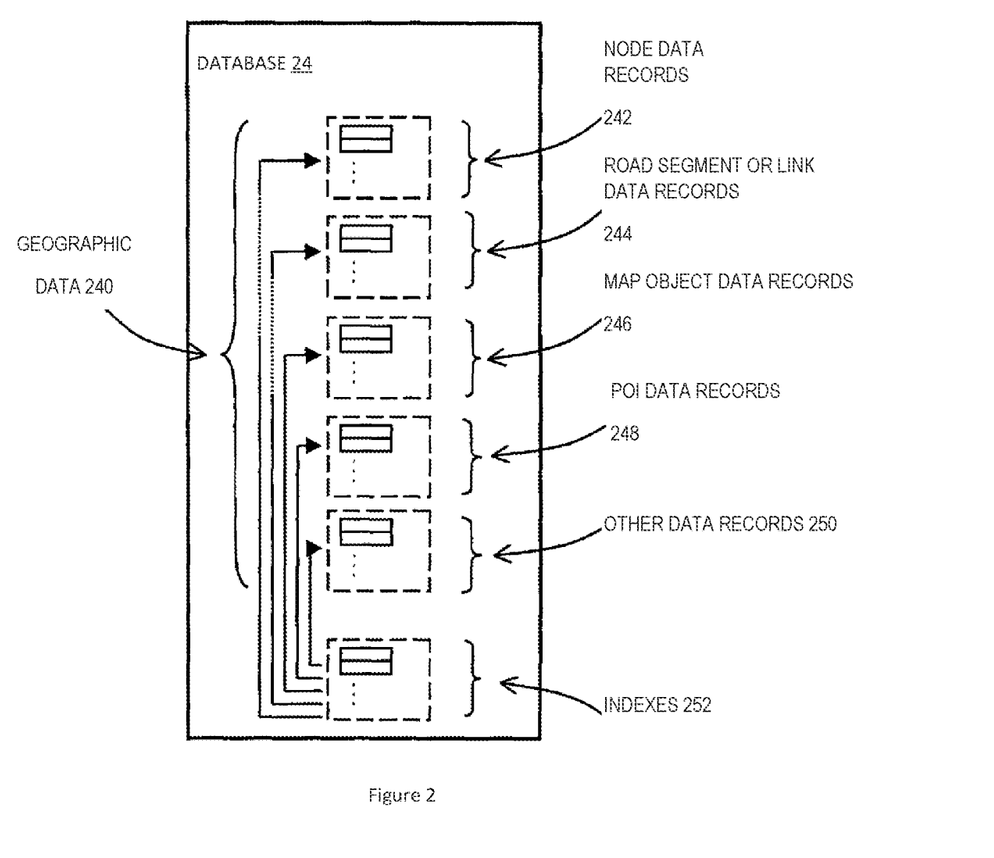
FIG. 2 is a block diagram of a geographic database of an example embodiment of the apparatus.

Turning to FIG. 2, the map or geographic database 24 may include various types of geographic data 240. This data may include but is not limited to node data 242, road segment or link data 244, map object data 246, point of interest (POI) data 248, or the like (e.g., other data records 250 such as traffic data). The map database 24 may also include cartographic data, routing data, and/or maneuvering data as well as indexes 252. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 24 may be maintained by a content provider e.g., the map data service provider and may be accessed, for example, by the content or service provider processing server. By way of example, the map data service provider can collect geographic data and dynamic data to generate and enhance the map database and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database 24 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 24 may be a master geographic database, but in alternate embodiments, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

Figure 3A:
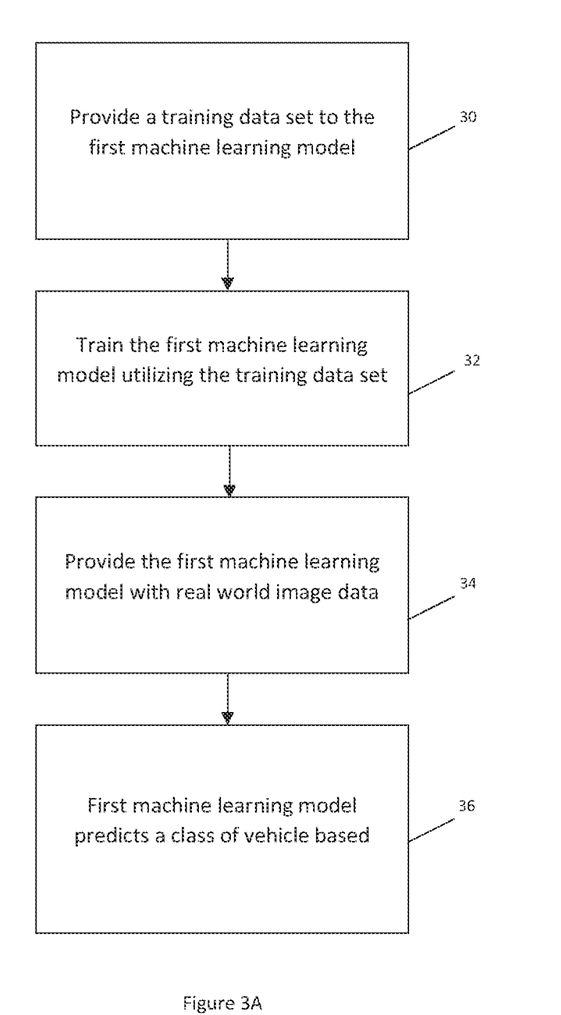
FIG. 3A is a flowchart illustrating the operations performed, such as by the apparatus of FIG. 1, in order to train machine learning models to identify the class of a vehicle

Referring now to FIG. 3A, the operations performed, such as by the apparatus 10 of FIG. 1, in order to train a machine learning model to predict the behavior of a vehicle based upon image data. More, fewer, or different acts or steps may be provided. As shown in block 30, the apparatus includes means, such as the processing circuitry 12, memory 14, the communication interface 16 or the like, for providing a training data set that includes a plurality of training examples. In this regard, the training data set may be provided by access by the processing circuitry of the training data set stored by the memory. Alternatively, the training data set may be provided by access by the processing circuitry to a database 24 or other memory device that either may be a component of the apparatus or may be separate from, but accessible to the apparatus, such as the processing circuitry, via the communication interface.

In accordance with an example embodiment, the apparatus 10 also includes means, such as the processing circuitry 12, the memory 14 or the like, configured to train a machine learning model utilizing the training data set. See block 32 of FIG. 3A. The machine learning model, as trained, is configured to predict the class of an unknown vehicle driven over the road surface based at least in part upon image data of the vehicle.

The apparatus 10, such as the processing circuitry 12, may train any of a variety of machine learning models to predict the class of the vehicle based upon a single or plurality of images. Examples of machine learning models that may be trained include a decision tree model, a random forest model, a neural network, a model that employs logistic regression or the like. In some example embodiments, the apparatus, such as the processing circuitry, is configured to separately train a plurality of different types of machine learning models utilizing the same training data including the same plurality of training examples. After having been trained, the apparatus, such as the processing circuitry, is configured to determine which of the plurality of machine learning models predicts the class of vehicle based upon image data with the greatest accuracy. The machine learning model that has been identified as most accurate is thereafter utilized to predict the class of vehicle.

In one example, the first machine learning model may be a deep learning neural network computer vision model that utilizes image data of a vehicle to classify vehicles automatically. A training example for this first machine learning model may include image data of a vehicle of a known class. Known classes could include, but are not limited to; broken down vehicles, tractor/trailer (semi-trucks), roadworks vehicles, farming vehicles, public passenger vehicles (e.g. buses), and normal passenger vehicles (e.g., sedans, light trucks, etc.). Various images of different types of vehicles are provided to the first machine learning model to train and improve its accuracy.

In some example embodiments, a balance or trade-off between the accuracy with which the class of vehicle is predicted and the efficiency with which the machine learning model predicts the class of vehicle is considered. For example, a first set of images may produce the most accurate prediction of the class of vehicle, but a second combination of images may produce a prediction of the class of vehicle that is only slightly less accurate, but that is significantly more efficient in terms of its prediction. Thus, the second combination of images that provide for sufficient, even though not the greatest, accuracy, but does so in a very efficient manner may be identified by the apparatus 10, such as the processing circuitry 12, as the preferred images to be provided to the machine learning model in order to predict the class of vehicle in subsequent instances.

In some embodiments, a training example also includes information regarding a map object, such as a map object that is located at the location at which the image data was captured. One example of a map object is a bridge, and another example of a map object is a railroad crossing. A wide variety of other map objects may exist including, for example, manhole covers, transitions between different types of road surfaces, various forms of infrastructure, or the like. As described in more detail below, the map object that is included in a training example may be determined or provided in various manners. For example, the map object may be defined, either manually or automatically, by reference to a map database 24 and identification of a map object at the same location or at a location proximate, such as within a predefined distance of, the location at which the corresponding image data was captured. The training example may also include point of interest (POI) data. A POI may be something like a truck stop, grain silo, shipping port, etc. Relevant POIs may also be defined, either manually or automatically, by reference to a map database 24 and identification of a POI at the same location or at a location proximate, such as within a predefined distance of, the location at which the corresponding image data was captured. The location of relevant POIs and/or map objects may be found by GPS coordinates or any other functionally capable means.

Once trained, the apparatus 10 can then be provided real world image data of vehicles and their surroundings as mentioned in block 34. For example, as a passenger sedan drives down a road, it may pass other cars, light trucks, SUVs and images of these vehicles may be captured by the camera systems of the apparatus.

The apparatus 10 may then identify these one or more types of vehicles on a given roadway as noted in block 36. All of the vehicles mentioned above may fall under the same class as identified by the first machine learning model (e.g., normal/fast moving vehicles). The passenger sedan may then pass a semi-truck with an over-sized load. The first machine learning model will identify this semi-truck as a different class than the other cars as it has the potential to drive slowly, obstruct traffic, etc.

Figure 3B:
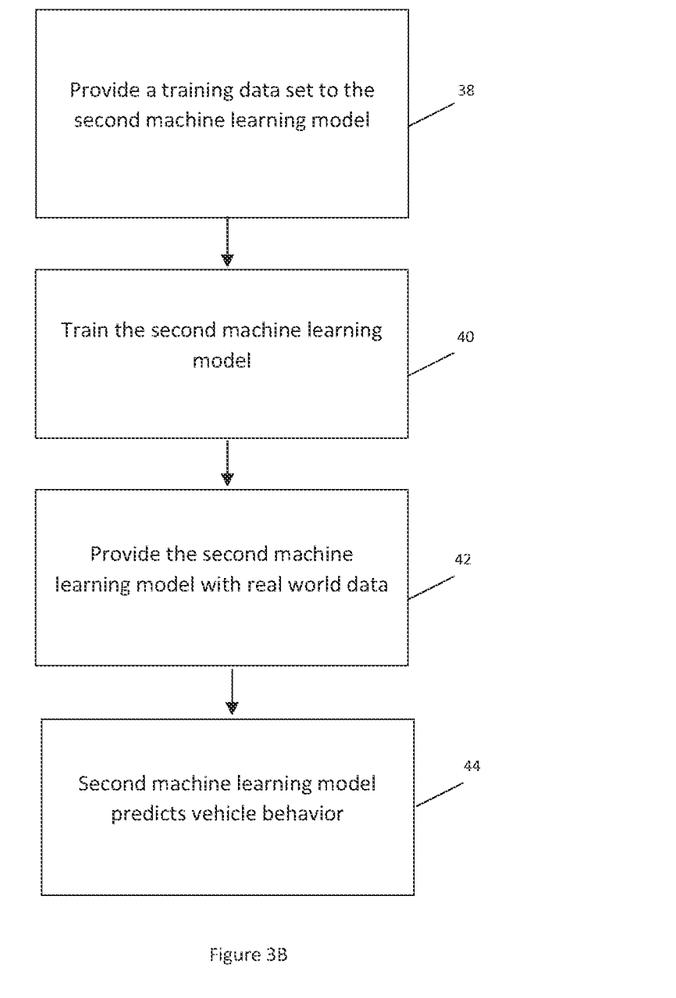
FIG. 3B is a flowchart illustrating the operations performed, such as by the apparatus of FIG. 1, in order to train machine learning models to predict vehicle behavior.

Moving to FIG. 3B, the location of these vehicles along with related POIs, map data, etc. from the map database 24 may then be passed to a second machine learning model as shown in block 38 to be used for training the second model.

The second machine learning model may include a decision tree model, a random forest model, a neural network, a model that employs logistic regression or the like. In some example embodiments, the apparatus, such as the processing circuitry, is configured to separately train a plurality of different types of machine learning models utilizing the same training data including the same plurality of training examples. After having been trained, the apparatus, such as the processing circuitry, is configured to determine which of the plurality of machine learning models predicts the behavior of s vehicle based upon image data with the greatest accuracy. The machine learning model that has been identified as most accurate is thereafter utilized to predict the behavior of a vehicle.

As mentioned above, the second machine learning model may be trained (block 40) and to conduct this training, the class identification data from the first machine learning model is provided to the second machine learning model along with related data and/or metadata about the identified vehicle. Such additional data may include, but is not limited to map geometry data, POI data, environment-based feature data, vehicle feature data, historical data, and/or map layer data.

Examples of map geometry data include incoming traffic lane, number of lanes in total, the present or upcoming speed limit, overtaking possibilities (e.g., no pass zones), road curvature, etc. Examples of POI data include POI proximity, types of POI, operating hours of the nearby POIs. Examples of environment-based feature data include the current or future weather, time of day, visibility (fog, night, lack of streetlights, etc.), seasonality, harvest times, shipping schedules, etc.

Vehicle feature data may include current speed and/or top speed, width/length of a vehicle, vehicle load status (e.g., loaded full versus unloaded); type of tires (tyres), weight of vehicle, number people in a vehicle, and historical routes taken by a given vehicle.

Historic data about a vehicle may include historical driving patterns, typical routes, routes for similar vehicles in the past, general data about how many vehicles of a certain class entered a given POI in a certain time frame, etc.

Various other types of map layer data may further include data about entrances and exits from a given POI, historical traffic patterns (e.g., rush hour), interplay between various map objects (e.g., bridges with low clearance which might stop an oversized load), etc.

Once trained, the second machine learning model may then be provided various real world data points as mentioned in block 42 and used to predict vehicle behavior based on these various data points and others (block 44). A non-limiting example of the apparatus 10 predicting vehicle behavior is that of a passenger car driving down a rural roadway during harvest season. As the car drives down the road, it comes upon a tractor or grain combine driving slowly down the highway. The apparatus 10 will identify the tractor via images captured by the car's camera system 22. The image data captured is provided to the first machine learning model which, when trained, will identify the class of vehicle present on the roadway. The apparatus 10 will then also identify one or more map objects, POIs, etc. in proximity to the tractor 10. One such POI, in this example, could be a grain elevator located down the road from the sedan and tractor. The class of vehicle (e.g., tractor/farm equipment) determination and POIs identified are then provided to the second machine learning model. The second machine learning model, once trained, will then be able to predict the behavior of the tractor. In this example, since the tractor, grain combine, etc. are moving down a rural highway the apparatus 10 may predict that the farm equipment may be headed towards the grain elevator POI.

This prediction data can then be utilized in various ways. The apparatus 10 may alert the driver of the sedan (and others) via graphical user interface that there could be a delay, the length of the delay based on the distance of the tractor from POI, etc. The apparatus may also update one or more map layers and/or databases to account for this delay. In some embodiments, the predicted slowdown caused by the slow-moving vehicle may be used to activate autonomous or highly assisted driving features. For example, if the sedan discussed above had self-driving capabilities the apparatus 10 could activate the self-driving mode in response to the delay caused by the tractor on the road and allow the driver to rest.

The prediction data may be utilized in other ways. For example, the apparatus 10 may provide to the end user updated route guidance which avoids certain areas with POIs proximate to them likely to cause a delay. Continuing with the example above, the apparatus 10 may look at existing map data to determine a better route which avoids the grain elevator POI during harvest season.

As mentioned before, the apparatus 10 features multiple machine learning models. These models and other data may be used by the apparatus 10 to not only analyze real time driving delay situations as mentioned above but also examine existing map data to identify other similarly situated roadways. These similar roadways will have similar POIs, map objects, etc. So, for example, if there was another rural road way close to a grain elevator the apparatus 10 may be able to detect such a similar roadway and provide alerts, route guidance, etc. to an end user to avoid potential delays.

Other examples of the apparatus 10 at work include urban settings in addition to rural settings. Urban settings are frequently hampered by slow moving vehicles such a buses or other forms of public transport (rail cars, etc.). In one embodiment, the apparatus 10 may be configured to run on an end user device such as a smart phone or tablet. The apparatus 10, running on an end user device may be used by not only automobile drivers but also drivers of motorcycles, mopeds, bicycles, scooters, etc. In one no limiting example, a delivery driver on a scooter may utilize the apparatus 10 via their smart phone mounted on the scooter. The smartphone's camera, traffic cameras, other vehicle's camera, etc. may be utilized by the apparatus 10 to capture image data and monitor for different classes of vehicle. As the end user drives around on their scooter, they may encounter a city bus driving along the street. The camera system 22 may capture an image of the bus as the scooter approaches and the apparatus 10 will confirm it is indeed a bus via the first machine learning model.

Once the bus has been identified, the apparatus 10 will examine the area of POIs, map objects, etc. which may cause a delay for the bus. In this example such a POI could be a bus stop ahead of the scooter and bus. If the bus is likely to stop at the designated bus stop as determined by the second machine learning model, then the apparatus can display an alert to the scooter driver to go around the bus or turn down a side street to avoid delay. It should be noted the apparatus 10 can identify POIs, map objects, etc. in real time via the camera system 22 and/or by existing map databases 24.

Figure 4:
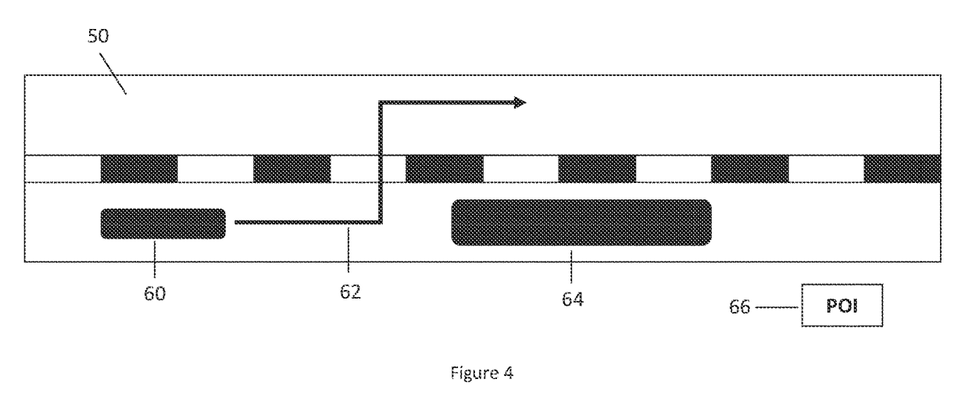
FIG. 4 is a graphical representation of a road upon which a passenger sedan and slow-moving vehicle are present with a POI proximate to the road.

Turning to FIG. 4, some of the examples discussed above are illustrated. Specifically, a sedan 60 is shown driving down a roadway 50 behind a larger slow-moving vehicle 64 with a POI ahead of both vehicles. As shown in FIG. 4, the sedan 60 is utilizing the apparatus 10 to predict the behavior of the slow-moving vehicle 64. The apparatus identifies the slow-moving vehicle via images from the camera system 22 of the car, traffic cameras, etc. and feeds those images into a first machine learning model which determines the class of the vehicle. In this example, the slow vehicle 64 is an oversized (wide) load and the first machine learning model classifies it as such. The apparatus then takes this class prediction data along with relevant other information which could contribute to the behavior of the slow-moving vehicle and feeds it to the second machine learning model.

It should be noted that the sedan 60 in this example represents any vehicle. Such vehicles may be standard gasoline powered vehicles, hybrid vehicles, an electric vehicle, a fuel cell vehicle, and/or any other mobility implement type of vehicle. The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, a graphical user interface (GUI) may be integrated in the vehicle, which may include assisted driving vehicles such as autonomous vehicles, highly assisted driving (HAD), and advanced driving assistance systems (ADAS). Any of these assisted driving systems may be incorporated into the GUI. Alternatively, an assisted driving device may be included in the vehicle. The assisted driving device may include memory, a processor, and systems to communicate with the GUI. In one embodiment, the vehicle may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

The slow-moving vehicle 64 mentioned above may be any sort of vehicle which can slow or impair movement down a roadway. Such vehicles include, but are not limited to semi-trucks, buses, farm equipment, other large machinery, road construction equipment, oversized loads, etc. In some examples, the slow-moving vehicle might also be stopped on the roadway so the apparatus 10 can account for broken down vehicles of any make or model and road work crews using steam rollers, etc.

In this example, there is a point of interest (POI) 66 adjacent to the roadway 50. The POI in this example is a truck stop and the apparatus 10 then uses this information, via the second machine learning model, to determine the likely behavior of the slow-moving vehicle. In this example, it is predicted by the apparatus that the slow-moving vehicle will pull into the truck stop POI. Based off this information, the apparatus may provide to the driver of the sedan 60 an alert along with route guidance 62 to avoid the delay. The route guidance 62 provided by the apparatus 10 is shown as an arrow which represents a suggested way to avoid the slow-moving vehicle (e.g., drive around it in the other lane).

In this example, the POI(s) adjacent to the given roadway signifies any POIs within reasonable proximity to the slow-moving vehicle such that the POI could impact vehicle behavior. There are many factors which can be considered by the apparatus to determine if a given POI is within reasonable range to be considered. Such data points were discussed above and can include but are not limited to map geometry data, vehicle feature data, historic data, and/or various other types of data. The proximity to the slow-moving vehicle may be set at a certain threshold (e.g., within 10 miles, 100 miles, etc.) and the apparatus may examine multiple relevant POIs within the distance threshold for a slow-moving vehicle. For example, if a truck full of harvested grain is going to pass two separate relevant POIs (a truck stop and grain depot) in the next 50 miles the apparatus may determine there is a increased chance of stopping based on the presence of multiple POIs.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus configured to predict behavior of a vehicle based at least in part on a class of the vehicle in real time, the apparatus comprising at least one processor and at least one memory storing computer program code, the at least one memory and the computer program code configured to, with the processor, cause the apparatus to at least:

obtain image data of the vehicle while driving from a via a vehicle camera system, wherein the image data includes physical characteristics of the vehicle, the physical characteristics distinguishing the vehicle as farm equipment;

provide the image data to a first machine learning model; and generate class prediction data for the vehicle utilizing the first machine learning model, wherein the first machine learning model generates the class prediction data based at least in part on the physical characteristics distinguishing the vehicle as farm equipment; wherein the at least one memory and the computer program code are further configured to, with the processor, cause the apparatus to further:

identify one or more points of interest upon a roadway located within a predefined distance at which the corresponding image data was captured via camera systems located upon the vehicle, wherein the one or more points of interest are relevant to farm equipment;

provide information regarding the one or more points of interest and the class prediction data for the vehicle to a second machine learning model;

predict the behavior of the vehicle utilizing the second machine learning model based upon the one or more points of interest and the class prediction data; and control a vehicle navigation system, a vehicle control system, a vehicle electronic control unit, or an autonomous vehicle control system in response to the predicted behavior of the vehicle.

2. The apparatus according to claim 1, wherein the at least one memory and the computer program code are configured to, with the processor, cause the apparatus to update a map layer with the predicted behavior of the vehicle.

3. The apparatus according to claim 1, wherein the at least one memory and the computer program code are configured to, with the processor, cause the apparatus to generate an alert in response to predicted vehicle behavior, wherein the alert is displayed on at least one end user device.

4. The apparatus according to claim 1, wherein the at least one memory and the computer program code are configured to, with the processor, cause the apparatus embodied by a computing device on board the vehicle, and/or embodied by a computing device of a driver or passenger on board the vehicle, to activate an autonomous driving mode in response to predicted vehicle behavior.

5. The apparatus according to claim 1, wherein the wherein the one or more points of interest which are relevant to farm equipment are a grain field, truck stop, grain elevator, grain silo, grain depot, or shipping port.

6. The apparatus according to claim 1, wherein the physical characteristics distinguishing the vehicle as farm equipment is the vehicle's cargo.

7. The apparatus according to claim 1, wherein the vehicle's cargo is grain.

8. The apparatus according to claim 1, wherein the at least one memory and the computer program code are configured to, with the processor, cause the second machine learning model to identify at least one other roadway with similar points of interest and cause the apparatus to generate an alert or route guidance in response to the presence of similar points of interest on the at least one other roadway.

* * * * *